Patented Nov. 7, 1950

2,529,131

UNITED STATES PATENT OFFICE 2,529,131

PROCESS FOR CONVERTING UNFERMENTABLE SUGARS IN VINASSE TO FERMENTABLE SUGARS

Firmin Boinot and Pierre Gautier, Melle, France, assignors to Les Usines de Melle (Societe Anonyme), of Saint-Leger-les-Melle, France, a corporation of France No Drawing. Application October 9, 1947, Serial No. 778,770. In France March 27, 1947

11 Claims. (Cl. 195—41)

This invention relates to hydrolysis of starch for sugar production and particularly to a process in which the sugar may be fermented to produce ethyl alcohol or other substances.

In commercial practice, hydrolysis of starch is generally effected with enzymes from malt or mucors, or with a mineral acid such as hydrochloric acid or sulfuric acid.

A lower yield of alcohol has been heretofore secured where acid hydrolysis is effected according to conventional technics, because the hydrolyzing action of such acids on suspended starch at concentrations as are required for commercial practice is not free from the so-called "reversion" phenomenon which causes accumulation of a fraction of sugar material in an unfermentable form, although no unconverted starch appears to remain; the proportion of said fraction is generally of the order of 13 to 15% with respect to the total sugars estimated as monosaccharides.

After hydrolysis, the wort is usually neutralized, fermented and distilled. Such reversion products still apear in wash or vinasse from such distillation. Whether the vinasse is forwarded according to common technics to a filtering plant where solid materials are separated therefrom, or merely dumped to waste, unfermentable but soluble reversion products are lost.

It will thus be realized that the alcohol yield as reckoned on original starch is lowered within limits substantially proportional to the amount of accumulated reversion products.

It is an object of our invention to provide a process whereby unfermentable reversion products are converted to fermentable sugars.

Another and important object of our invention is to improve the technics of hydrolysis of starch by means of acids.

The invention accordingly comprises the novel processes and steps of processes, specific embodiments of which are described hereinafter by way of example and in accordance with which we now prefer to practice the invention.

With the above objects in view, we subject to an acid hydrolysis under the conditions to be hereinafter set forth, the vinasse such as above obtained containing unfermentable but hydrolyzable sugar to obtain a further amount of sugars quite fit for alcoholic fermentation, and which may be fermented in the usual manner or otherwise to produce ethyl alcohol or other products.

If the supplemental proportion of ethyl alcohol produced in this way is measured, it is found that it may amount to or even exceed 20% of the quantity obtained during distillation of initial worts. The practice of our invention thus assures a very large increase of alcohol yield.

The main conditions to be applied for effecting acid hydrolysis of vinasse are such a high dilution of the vinasse so that any tendency to fermentation of reversion products during said hydrolysis is substantially precluded; the use of a relatively high proportion of acid to unfermentable sugar, and a cooking period of the acidified vinasse which is limited to prevent any substantial destruction of sugars.

When it is borne in mind that the proportion of sugars to be hydrolyzed in the vinasse is far lower than the proportion of amylaceous materials to be converted to fermentable sugars by hydrolyzing starting liquors, the treatment in diluted medium according to this invention after a treatment in a more concentrated medium of starting amylaceous materials is nevertheless economic in consideration of the additional alcohol of which it permits recovery, while hydrolyzing the starting amylaceous materials in so dilute a medium would be much too costly to be commercially profitable in spite of the less proportion of reversion products.

The concentration of sugars in the vinasse to be treated should be brought in actual practice to no more than about 3% of the weight of liquid to be treated. As to the proportion of acid to be employed for effecting hydrolysis, it should be of about 8 to 15% by weight (expressed as hydrochloric acid) with respect to the amount of sugars to be treated; the pH value of the liquor to which hydrolyzing acid has been added is then from 1.8 to 2.3, such values corresponding to admissible limits in carrying this invention into practical effect.

The cooking period of the acidified vinasse is preferably from about 15 minutes to about 60 minutes at a temperature of about 140–160° C., corresponding to pressure limits of about 3.5 to 6.5 kgs. per sq. cm.

It will thus be realized that the unfermentable sugars are hydrolyzed in a more dilute medium, with a larger proportion of acid and for a shorter time than employed in the commercial hydrolysis of the fermentable and unfermentable sugars for subsequent fermentation, and this is a characteristic feature of our invention.

The following examples will show how our invention may be carried out. The invention is not to be considered as restricted thereto except as indicated in the appended claims.

*Examples*

1. One hundred kgs. of corn flour are suspended in so much water as to produce a total volume of about 450 liters. A proportion of hydrochloric acid from 17 to 20 grams per kg. of flour, i.e., 2.8 to 3.3% of acid with respect to starch, is added to the supension.

The supension is heated to a temperature that may be slightly above or slightly below 100° C., while being vigorously stirred by known means. The said temperature is maintained, and stirring is proceeded with, until complete liquefaction of the starch-paste as appears at some time. By way of indication, we may state that the temperature and stirring necessary for liquefaction of starch-paste are maintained for about 15 minutes.

The mass is then held by means of steam under a pressure of 4 kgs. per sq. cm. for a time which is variable but is generally about 60 minutes. This is the initial saccharifying-cooking step.

The cooked mass is cooled, the acidity is partly neutralized up to a limit which is acceptable for alcoholic fermentation. Such a limit may be expressed in terms of pH value which is of about 5.5 but it may be raised or lowered within certain limits, without any disadvantage.

The cooled and neutralized mass is then subjected to alcoholic fermentation and when the latter is completed, an amount of alcohol of the order of 35 to 38 liters per 100 kgs. of flour employed is distilled off. After removal of alcohol, unfermentable materials in the wash (vinasse) may be estimated, and it is found that their amount expressed in terms of glucose is generally of the order of 17 to 20 grams per liter of wash.

Acid is then added to the vinasse in such an amount and at such a dilution that the proportion of mineral acid per liter is about 2.5 grams (i. e., about 12.5% with respect to sugars) and the pH value is about 2.1. The mass is then heated under a pressure of 4 kgs. per sq. cm., for example, for 30 minutes, with superheated steam injected into a cooking autoclave provided with a blow-off valve adjusted to open at said pressure.

It is further ascertained at that time that the content of fermentable sugars expressed as glucose is generally twice the content estimated in the vinasse before hydrolysis. Consequently a new and important quantity of sugar has appeared.

In this connection, it seems that we may advance the following theory: Under the conditions of the first hydrolysis and chiefly by reason of the relatively high sugar concentration in the medium, a certain proportion of fermentable and reducing sugars (glucose) has been condensed to heavier products which generally comprise two glucose molecules so combined that one of their aldehyde groups is blocked. Such products are the so-called reversion products above referred to. They are not fermentable but can be estimated by conventional methods since they still have a free aldehyde group. The above theory is offered as an explanation, although we do not desire to be bound thereby.

The second hydrolysis effected in a much more dilute medium results in again splitting the reversion products into two glucose molecules thereby setting free that aldehyde group which had been blocked. Therefore after the second hydrolysis, a new estimation shows that the sugar content has doubled.

The mass is cooled, the pH value brought back to about 5.5 and a second alcoholic fermentation effected.

The formerly unfermented sugars are then easily fermented after this supplemental hydrolysis and it is during the second fermentation that the new amount of alcohol obtained may reach or exceed 7 liters per 100 kgs. of initially employed corn flour.

2. One hundred and twenty kgs. of maize flour are suspended in 480 liters of water and saccharified by a process analogous to that of Example 1. Acidity is then neutralized up to the usual pH, and alcoholic fermentation is proceeded with. Through distillation of the fermented mash, a quantity of ethyl alcohol corresponding to 35.7 liters per 100 kgs. of flour employed is obtained.

To the wash or vinasse resulting from distillation hydrochloric acid is added in proportion of 2 grams acid per liter of vinasse, so that the pH value is brought to 2.1; cooking is then effected under a pressure of 4 kgs. per sq. cm., for about one hour.

A sugars test in the vinasse, before hydrolysis of the same, has shown a content of about 16 grams unfermentable sugars per liter of vinasse; after hydrolysis, a further test indicates a content of 30 to 31 grams fermentable sugars, expressed in terms of glucose, per liter.

The hydrolyzed vinasse is then brought to the pH and temperature conditions required for fermentation, as in Example 1 and is submitted to alcoholic fermentation, and the alcohol so obtained is distilled off.

In this manner, we collect still 7.25 liters of ethyl alcohol per 100 kgs. of flour initially employed.

The total yield of the operation is of about 43 liters of alcohol per 100 kgs. of maize flour.

The indications in the foregoing examples are still valid if an amylaceous material other than those above-mentioned is employed as a starting material.

Any one of the other acids proposed for hydrolysis of the type concerned, for instance but without limitation, sulfuric acid or phosphoric acid, may be substituted for hydrochloric acid by an equivalent amount.

If it is not intended to use sugars as produced according to this invention for ethyl alcoholic fermentation, they may be employed for other fermentations such as, for example, acetonobutylic fermentation, butyleneglycolic fermentation, lactic fermentation, aliphatic fermentations and so on.

Finally such sugars may also be used for the production of baking yeast or food yeast by known methods with a yield of pressed yeast (water content 72%) of about 1.700 kgs. per kg. of sugars.

According to the invention above described, the same results are obtained when vinasse is derived from acid saccharified worts which have been filtered prior to being subjected to the first fermentation, or when the same vinasse has been filtered prior to supplemental hydrolysis.

The above examples should not be construed as limiting our invention, the principle and realization of which are essentially based on the means for converting unfermentable sugars to fermentable sugars.

Consequently it is within the scope of this invention to vary either the nature or the proportion of acid, or temperatures, or heating period, or amount of dilution, of unfermentable sugars to be converted to fermentable sugars.

Our invention is also applicable to continuous processes for acid saccharification of amylaceous materials. Respecting the treatment in accordance with this invention, vinasse continuously flowing from the distillation column may be passed to an acid addition zone and thence through a pressure cooking zone at a proper rate to secure the required time of presence in said zone.

The expression "strong mineral acid" as used in the appended claims is intended to designate hydrochloric, sulfuric and phosphoric acids and their recognized equivalents of hydrolyzing strength.

What we claim is:

1. A process for converting unfermentable sugars to fermentable sugars in a vinasse of the type described, which comprises heating said vinasse in such a dilute condition as to contain no more than about 3% by weight of said unfermentable sugars, for about 15–60 minutes at a temperature of about 140–160° C., with an amount of a strong mineral acid equivalent to about 8–15% of hydrochloric acid as reckoned on the weight of said unfermentable sugars and converting substantially completely said unfermentable sugars to fermentable sugars.

2. A process for converting unfermentable sugars to fermentable sugars in a vinasse of the type described, which comprises injecting steam under a pressure of about 3.5–6.5 kgs. per sq. cm. for about 15–60 minutes into a body of said vinasse which contains no more than about 3% by weight of said unfermentable sugars, contains an amount of a strong mineral acid equivalent to about 8–15% of hydrochloric acid as reckoned on the weight of said unfermentable sugars, and is confined in a cooking zone having a steam blow-off exit adjusted to open at said steam pressure and converting substantially completely said unfermentable sugars to fermentable sugars.

3. A continuous process for treating a vinasse of the type described, which comprises passing said vinasse through an acidification and dilution zone, adding water and strong mineral acid to said vinasse in said zone sufficient to bring the proportion of unfermentable sugars in said vinasse to no more than 3% by weight and the proportion of strong mineral acid in said vinasse with respect to said unfermentable sugars to the equivalent of about 8–15% by weight of hydrochloric acid, then passing the acidified and diluted vinasse through a cooking zone at a temperature of about 140–160° C. at such a rate as to expose said vinasse to said temperature for about 15–60 minutes and converting substantially completely said unfermentable sugars to fermentable sugars.

4. In a process for producing sugars from an amylaceous material by heating an aqueous suspension of said material with a strong mineral acid, partly neutralizing the liquid thus obtained, subjecting the partly neutralized liquid to alcoholic fermentation, and distilling the fermented liquid to expel therefrom the alcohol produced therein and to obtain a vinasse containing substantially no fermentable sugar but containing unfermentable sugars as a residue, the step of heating said vinasse with a greater proportion of said mineral acid with respect to the sugar content, for a shorter period of time, and with the sugars therein in a more dilute condition than in the first named step of heating said aqueous suspension of amylaceous material.

5. A process for the production of alcohol from an amylaceous material, which comprises hydrolyzing said material in an aqueous medium containing a strong mineral acid to produce an aqueous solution of fermentable sugars in major proportion and unfermentable sugars in minor proportion, subjecting said solution to alcoholic fermentation, separating alcohol from the fermented solution to obtain a vinasse containing said unfermentable sugars but containing substantially no fermentable sugar, hydrolyzing said unfermentable sugars in a larger proportion of aqueous medium containing a greater relative proportion of a said mineral acid and for shorter time than for said hydrolysis of amylaceous material, so as to produce an aqueous solution of fermentable sugars, adjusting the pH value of the last-named solution to about 5.5, subjecting said last-named solution to alcoholic fermentation, and separating therefrom the alcohol thus produced.

6. A process for converting unfermentable sugars to fermentable sugars in a vinasse of the type described containing substantially no fermentable sugar, which comprises adding so much aqueous strong mineral acid to said vinasse as to give it a pH value of 1.8–2.3 and secure a concentration of unfermentable sugars therein of no more than 3%, and cooking the vinasse at a temperature of about 140–160° C. for about 15–60 minutes.

7. A process for converting unfermentable sugars to fermentable sugars in a vinasse of the type described containing substantially no fermentable sugars, which comprises adjusting the pH value of said vinasse to 1.8–2.3 by means of a strong mineral acid and diluting said vinasse with water to secure an unfermentable sugar concentration of no more than 3%, and exposing the acidified and diluted vinasse to sugar hydrolyzing temperature and pressure conditions until the sugar content expressed in terms of glucose has reached about twice its original value.

8. A process which comprises, hydrolyzing a vinasse which contains an unfermentable hydrolyzable sugar content of not over about 3% but substantially no fermentable sugar, with a strong mineral acid to change the unfermentable sugar to fermentable sugar.

9. A process which comprises, hydrolyzing a vinasse which contains an unfermentable hydrolyzable sugar content of not over about 3% but substantially no fermentable sugar, with a strong mineral acid at a pH of about 1.8–2.3 at a temperature of about 140–160° C. to saccharify unfermentable sugar therein.

10. A process which comprises, hydrolyzing a vinasse which contains an unfermentable hydrolyzable sugar content of not over about 3% but substantially no fermentable sugar, with a strong mineral acid to change the unfermentable sugar to fermentable sugar, neutralizing at least part of the acidity of the hydrolyzed product containing fermentable sugar, subjecting the so neutralized product to alcoholic fermentation, and recovering alcohol therefrom.

11. A process for converting starch in starchy material to sugar which comprises, hydrolyzing such material to change the starch to fermentable and unfermentable sugars, separating the unfermentable sugar in solution from the fermentable sugar, to obtain a vinasse, diluting the vinasse acidifying the unfermentable sugar with a strong mineral acid, and heating the mixture to saccharifying temperature thereby converting unfermentable sugar to fermentable sugar.

FIRMIN BOINOT.
PIERRE GAUTIER.

REFERENCES CITED

The following references are of record in the file of this patent:

UNITED STATES PATENTS

| Number | Name | Date |
| --- | --- | --- |
| 2,026,237 | Legg | Dec. 31, 1935 |
| 2,169,244 | Hildebrandt et al. | Aug. 15, 1939 |
| 2,201,609 | Dale et al. | May 21, 1940 |
| 2,348,451 | Christensen | May 9, 1944 |